(12) United States Patent
Master

(10) Patent No.: US 10,932,617 B2
(45) Date of Patent: Mar. 2, 2021

(54) OVEN WITH MOVING SOLID FUEL BED

(71) Applicant: Chilly Charcoal Chicken Company Limited, London (GB)

(72) Inventor: Dhiren Master, London (GB)

(73) Assignee: CHILLY CHARCOAL CHICKEN COMPANY LIMITED, London (GB)

( * ) Notice: Subject to any disclaimer, the term of this patent is extended or adjusted under 35 U.S.C. 154(b) by 0 days.

(21) Appl. No.: 15/919,766

(22) Filed: Mar. 13, 2018

(65) Prior Publication Data

US 2018/0279827 A1    Oct. 4, 2018

(30) Foreign Application Priority Data

Mar. 31, 2017 (GB) .................................... 1705191

(51) Int. Cl.
*A47J 37/04* (2006.01)
*A47J 37/07* (2006.01)

(52) U.S. Cl.
CPC .......... *A47J 37/045* (2013.01); *A47J 37/044* (2013.01); *A47J 37/0754* (2013.01); *A47J 37/041* (2013.01); *A47J 37/079* (2013.01)

(58) Field of Classification Search
CPC .......... A47J 37/044; A47J 37/045; F27B 9/24
See application file for complete search history.

(56) References Cited

U.S. PATENT DOCUMENTS

| | | | |
|---|---|---|---|
| 1,632,176 A | | 6/1927 | Crain |
| 3,659,518 A | * | 5/1972 | Porter ................... A47J 37/044 99/386 |
| 3,695,170 A | * | 10/1972 | Ehrenberg ............ A47J 37/044 99/386 |
| 3,739,712 A | * | 6/1973 | Duning ................. A47J 37/044 99/349 |
| 5,460,080 A | * | 10/1995 | Maru, Jr. .............. A47J 37/041 99/420 |
| 5,821,503 A | * | 10/1998 | Witt ........................ A21B 1/48 219/388 |

(Continued)

FOREIGN PATENT DOCUMENTS

| | | |
|---|---|---|
| JP | 2006115870 | 5/2006 |
| JP | 2008228745 A | * 10/2008 |

OTHER PUBLICATIONS

Machine translation of JP20082287745A, google patents, retrieved Sep. 28, 2019 (Year: 2019).*
Machine English translation of JP2006115870.

*Primary Examiner* — Avinash A Savani
*Assistant Examiner* — Deepak A Deean
(74) *Attorney, Agent, or Firm* — Ladas & Parry LLP

(57) ABSTRACT

A rotisserie oven for cooking food, eg spatchcock chicken, comprises an oven enclosure (23), a solid fuel conveyor (2) for conveying a burning solid fuel (eg charcoal) bed through the oven enclosure, and a food conveyor (3) crossing the solid conveyor transversely within the oven enclosure. The charcoal is lit outside the oven enclosure by a gas burner (21) and high temperature combustion, eg at 250° C. to 450° C., is supported by a jet of hot air (c) injected by a hot air blower (19) into the oven enclosure. Hot combustion gas circulates within the enclosure and the speed of the solid fuel conveyor is controlled in response to the output signal of a thermocouple (17) to maintain a desired cooking temperature.

18 Claims, 2 Drawing Sheets

(56) References Cited

U.S. PATENT DOCUMENTS

| | | | |
|---|---|---|---|
| 6,910,410 B2 * | 6/2005 | Sada | A47J 37/07 99/329 P |
| 2003/0230200 A1 * | 12/2003 | Cheung | A47J 37/041 99/419 |
| 2004/0177769 A1 * | 9/2004 | Kobayashi | A21B 1/245 99/360 |
| 2007/0221199 A1 * | 9/2007 | Hake | F24C 15/2021 126/299 R |
| 2008/0156201 A1 * | 7/2008 | Cook | A21B 1/44 99/443 R |
| 2017/0318819 A1 * | 11/2017 | van de Rijt | A47J 37/044 |

* cited by examiner

OVEN WITH MOVING SOLID FUEL BED

The present invention relates to an oven with a moving bed of solid fuel. The invention relates particularly but not exclusively to a charcoal oven with a moving charcoal bed.

Tandoor ovens are well known for the excellent taste they impart to cooked meat, eg chicken, and typically comprise a cylindrical clay pot in which charcoal or wood is burned to cook the meat by radiant heat and convection. The temperature within a tandoor oven can approach 250° C. to 350° C. However a tandoor oven is not suitable for cooking on a continuous basis in a "fast food" environment. Operation of a tandoor oven requires specialist skills to maintain the temperature of the oven and to judge when the food is properly cooked. Furthermore, insertion of the food into the hot oven carries a risk of burning or scalding.

Charcoal beds are also used in barbecues for outdoor cooking but conventional charcoal beds and barbecues are unsuited for use indoors, and typically operate at lower cooking temperature ranges of 150° C. to 200° C.

Ovens employing moving beds of burning charcoal are known. For example U.S. Pat. No. 1,632,176 discloses an oven for cooking meat with a moving bed of charcoal on a conveyor. The meat is stationary. JP2006115870A and U.S. 6,910,410 disclose grilling arrangements having a charcoal conveyor and a parallel meat conveyor. However the cooking zone in these arrangements is relatively large and difficult to insulate. Hence the cooking temperature is not particularly high and the cooking time is correspondingly prolonged.

An object of the present invention is to provide an oven in which at least some of the features of the tandoor oven, such as high cooking temperature and intense radiative heating, are provided by a moving bed of burning solid fuel.

Accordingly the invention provides an oven comprising an oven enclosure, a solid fuel conveyor for conveying a burning bed of solid fuel through the oven enclosure, and a food conveyor crossing the solid fuel conveyor transversely within the oven enclosure.

Because the food conveyor crosses the solid fuel conveyor, the food (eg meat eg chicken) is cooked in the zone of the intersection, which is relatively small in comparison with the overlap of parallel solid fuel and meat conveyors in the prior art. Such a small cooking zone can be heated intensely, resulting in rapid cooking and retention of flavour.

Preferably the oven enclosure comprises a clay or ceramic interior surface. This provides a radiation spectrum which approaches the black body radiation spectrum, the optimum for cooking.

Preferably the oven further comprises a blower arranged in use to inject air into the oven enclosure in such a direction as to circulate hot combustion gas over the food in the crossing region of the conveyors. This feature speeds up convective heat transfer and shortens cooking time.

Preferably the oven enclosure has a concave internal surface at a crossing region of the conveyors which concentrates radiative heat on the food in the crossing region. This feature mimics a feature of the tandoor oven (although the concave internal surface is preferably in the top of the enclosure, eg in the form of a vault, rather than in the sidewall as in the tandoor clay pot) and enhances the cooking.

Preferably the oven enclosure has a concave internal surface at the crossing region of the conveyors which is arranged in use to circulate hot combustion gas over the food in the crossing region. This feature enhances convective heat transfer.

Preferably the concave internal surface is disposed above the crossing region of the conveyors. For example the concave internal surface may be part-cylindrical.

Preferably the oven enclosure comprises an inner wall and an outer wall spaced apart from the inner wall to define an exit passage between the inner and outer walls for venting hot combustion gas from the oven enclosure. This feature improves heat insulation of the oven enclosure, as well as transferring heat from the hot combustion gas back into the main cooking vault space, thereby creating and maintaining a high temperature in the cooking area Preferably said concave internal surface is an inner surface of said inner wall.

Preferably in use, hot combustion gas circulates within said oven enclosure and said exiting combustion gas flows through said exit passage in the direction opposite to the direction of circulation of hot combustion gas.

In preferred embodiments the solid fuel conveyor extends from outside the oven enclosure to inside the oven enclosure and the oven further comprises a lighter which is arranged to light the solid fuel bed before it enters the oven enclosure. This feature maximises the heating effect of the solid fuel bed.

Preferably one or both ends of the food conveyor extend outside the oven enclosure. This feature facilitates loading uncooked food onto and/or unloading cooked from the food conveyor, and enables food to be loaded/unloaded into the oven with minimal risk of burning/scalding Preferably the oven further comprises a temperature sensor arranged to monitor the temperature within the oven enclosure and to output a temperature signal and a speed controller coupled to the solid fuel conveyor and responsive to the temperature signal. For example the speed controller may be arranged to keep the temperature within a predetermined range.

In a preferred embodiment the food conveyor comprises an array of chicken holders arranged to hold spatchcock chickens. Preferably the oven further comprises means for rotating the chicken holders during their linear travel.

In a preferred embodiment the food conveyor has a lower run crossing beneath a lower run of the solid fuel conveyor and an upper run crossing above an upper run of the solid fuel conveyor. Optionally, ash is deposited from the end of the upper run of the solid fuel conveyor and collects beneath the lower run of the food conveyor. This ash provides further heat to the oven before the ash is removed.

Preferably the solid fuel conveyor comprises a chain of supporting grids, the supporting grids being hingedly connected to each other at leading and trailing edges thereof.

Preferably the solid fuel conveyor is arranged to provide a moving bed of solid fuel which heats the interior of the oven enclosure to a temperature of above 200° C., more preferably above 250° C., most preferably in the range 250° C. to 450° C. Preferably the solid fuel conveyor is loaded with charcoal.

Preferably the chicken conveyor is arranged to move at such a rate that the cooking time of a chicken within the oven enclosure is below 15 minutes, more preferably below 10 minutes, most preferably in the range 4 minutes to 8 minutes.

The invention also provides a method of roasting food comprising loading food onto an inlet end of the food conveyor of an oven as defined above, roasting the food over a moving bed of burning solid fuel in the oven enclosure thereof and unloading cooked food from an outlet end of the food conveyor.

Preferably the solid fuel is charcoal or (less preferably) wood.

Preferably the food is meat or fish.

A preferred embodiment of the invention is described below by way of example only with reference to FIGS. 1 to 3 of the accompanying drawings, wherein.

Figure 1:
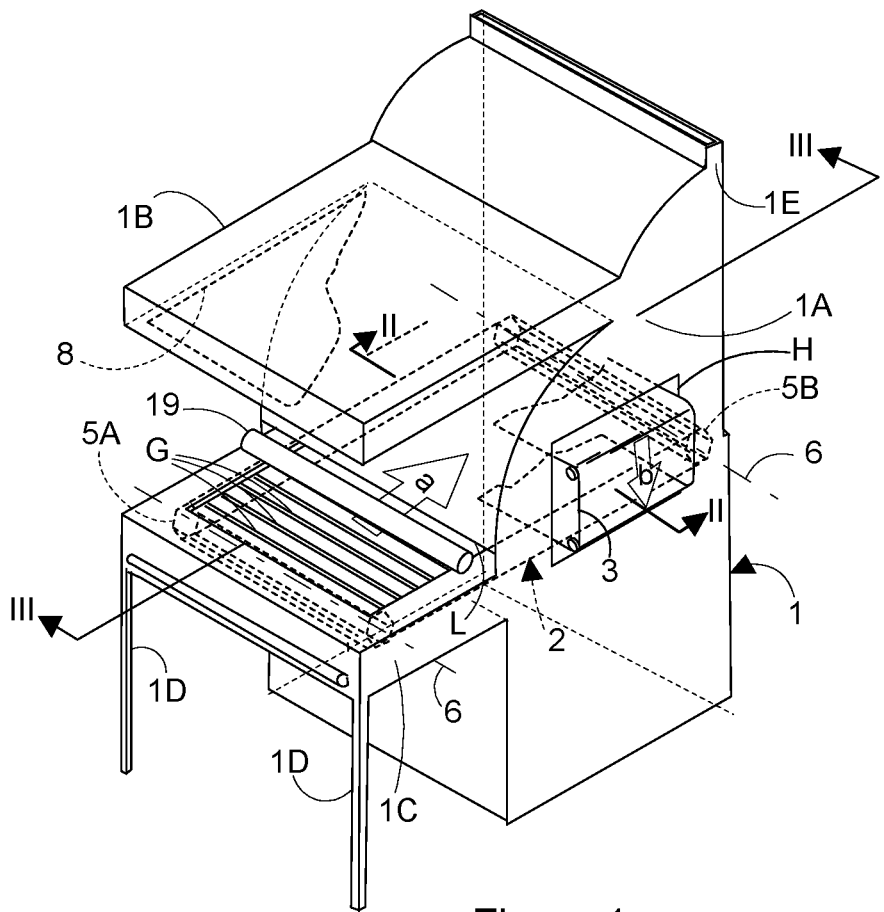
FIG. 1 is a somewhat diagrammatic isometric view of a charcoal oven in accordance with the invention.

Referring to FIG. 1, the charcoal oven shown comprises a casing 1, formed of eg stainless steel sheet. The casing has an oven enclosure portion 1A with a part-cylindrical front surface and a fume hood 1B projects forwardly from the oven enclosure portion. An exit flue 1E at the upper rear edge of the casing communicates with the fume hood 1B and the oven enclosure portion 1A as described below with reference to FIG. 3.

Figure 3:
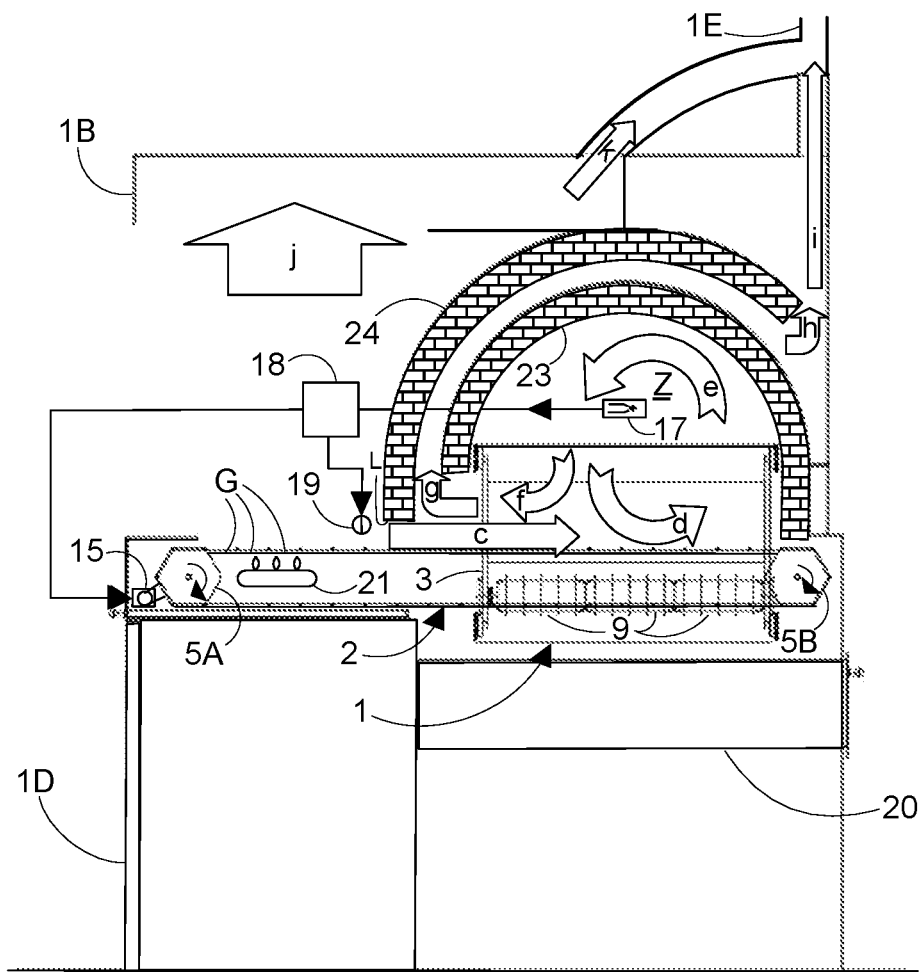
FIG. 3 is a diagrammatic sectional side elevation of the charcoal oven taken on III-III of FIG. 1.

A forwardly-projecting portion 1C of the casing is supported at waist height by left and right legs 1D at the front of the enclosure and accommodates an external portion of a charcoal conveyor 2. The charcoal conveyor 2 is supported by front and rear hexagonal rollers 5A and 5B respectively and comprises a continuous chain of grids G for supporting the charcoal. The grids are hingedly connected to each other at their leading and trailing edges and correspond in length to the the width of the longitudinal faces of the hexagonal rollers 5A, 5B to allow the grids G of the conveyor 2 to wrap around these rollers, as is best shown in FIG. 3.

As indicated by the broad arrow a, the upper run of charcoal conveyor 2 advances beneath a hot air blower 19 and a lip L of the oven enclosure toward the rear of the enclosure 1 and carries a bed of burning charcoal C (FIG. 2) into the oven enclosure. This is described in more detail below with reference to FIG. 2.

The rear portion of conveyor 2 is disposed within the oven enclosure portion 1A and a chicken conveyor 3 runs in the anticlockwise direction (as indicated by broad arrow b) over the upper run and below the lower run of conveyor 2. Hot ash from the charcoal conveyor is deposited from the rear roller 5 into an ash tray 22 (FIG. 3).

As shown, the exit end of chicken conveyor 3 projects outside the oven enclosure through an unloading hatch H at the right hand side of the enclosure 1. Cooked chickens are unloaded from the chicken conveyor via hatch H. The entry end of chicken conveyor 3 (not visible in FIG. 1) projects similarly from a loading hatch (not shown) at the left hand side of the enclosure 1 and spatchcock chicken carcasses are loaded onto the chicken conveyor 3 via the loading hatch.

As explained below with reference to FIGS. 2 and 3, the charcoal bed is lit before it enters the oven enclosure. Smoke and combustion gas from the external portion of the charcoal bed enter mouth 8 of fume hood 1B and combine with smoke and combustion gas from the internal portion of the charcoal bed and exit via exit flue 1E, as described in more detail below with reference to FIG. 3.

Figure 2:
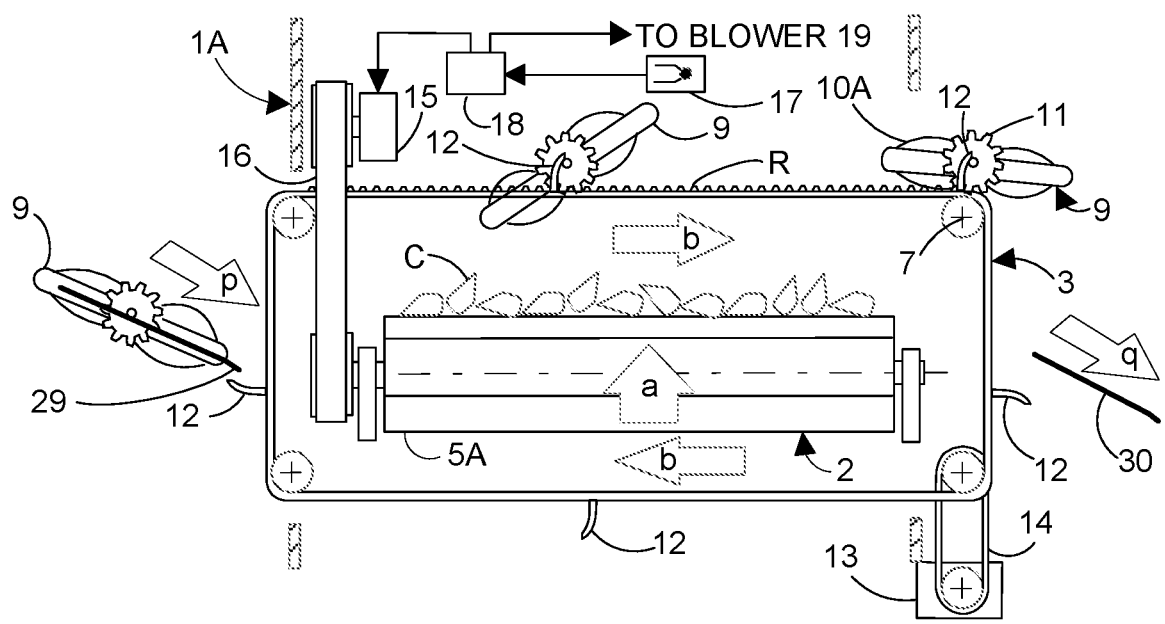
FIG. 2 is a diagrammatic sectional elevation of the conveyor arrangement, taken on II-II of FIG. 1.

Referring now to FIG. 2, the chicken conveyor 3 is in the form of a rotisserie conveyor chain supported on four chain rollers which rotate about axes 7. One or more of the chain rollers is mounted on a sprung support (not shown) which is arranged to maintain tension in the chicken conveyor The assembly is driven by an electric motor 13 via a chain wheel transmission 14, of sufficient length to allow the motor 13 to be located in a cool lower part of the oven.

Optionally the height of the conveyor 3 can be varied to compensate for variations in charcoal quality (in particular, combustion temperature) to achieve the optimal cooking temperature range.

The conveyor chain has a series of projections 12 attached to it at regular spacings along its length. Projections 12 engage the central axles of rotisserie chicken cage assemblies 9 which each include a sprocket wheel 11 which engages a fixed rack R located adjacent the upper run only of the rotisserie conveyor chain. Each sprocket wheel is fixed to its associated chicken cage and thereby holds a spatchcock chicken carcass 10A in a defined orientation about the chain wheel axis at a given point in the travel of the upper run of the conveyor chain 3. During the travel of the conveyor 3, the rotisserie chicken cage assemblies 9 are rotated continuously in the clockwise direction by engagement of the sprocket wheels 11 with the rack R as shown in order to ensure even cooking of the chicken carcasses 10A. Each chicken cage assembly 9 comprises a transverse linear array of three or more butterfly cages which each hold a spatchcock chicken carcass.

The chicken cage assemblies 9 are loaded with carcasses and fed into engagement with the projections 12 by being slid down a downwardly-inclined loading rack 29 at the loading hatch (on the left side of the conveyor) in the direction indicated by arrow p as shown.

Chicken cage assemblies 9 containing cooked chickens 10A are removed (in the direction indicated by arrow q) from the unloading hatch H (FIG. 1) at the right hand side of the conveyor by being tipped onto a downwardly-inclined unloading rack 30.

The charcoal conveyor 2 is driven by a belt or chain drive 16 from a speed-controlled motor 15 which is located in a cool part of the oven. A thermocouple 17 located in the oven enclosure near the path of the chicken carcasses generates a temperature signal which is output to an electronic controller 18. Controller 18 outputs a motor control signal which controls the speed of motor 15 in such a manner as to keep the temperature within a desired range, eg 250° C. to 450° C., eg by slowing the motor down when the temperature exceeds this range (so that complete combustion of a given portion of the continuous charcoal bed C occurs before it reaches the rear end of the charcoal conveyor) and speeding the motor up when the temperature falls below this range.

In this manner the proportion of the charcoal bed on the upper run of the charcoal conveyor which is burning can be controlled by varying the motor speed.

In a less-preferred variant, the charcoal bed can be arranged to be partially burnt up by the time it reaches the end of the charcoal conveyor, so that speeding up the motor 15 lowers the oven temperature (because less of the charcoal is burned) and slowing down the motor raises the oven temperature (by increasing the burning of the charcoal).

Controller 18 optionally generates a further output signal which controls the air output of a blower 19 which is described in detail below with reference to FIG. 3.

In a variant, the speed of motor 15 is not controlled by the controller 18 and temperature control is achieved by varying the output of blower 19.

Typically, a traverse of the conveyor 3 from entrance to exit of the oven enclosure 1A will take 5 to 10 minutes.

Optionally the butterfly cages at the sides of the conveyor 3 (where the temperature of the charcoal bed is lower) can be used to hold food that requires a lower cooking temperature.

Optionally the conveyor 3 can be arranged to convey some or all of the food in multiple passes through the oven enclosure 1A for longer cooking times.

FIG. 3 shows the oven enclosure in more detail. The oven enclosure comprises an inner wall 23 which forms a semi-cylindrical vault and a part-cylindrical outer wall 24 which defines an intermediate flue of annular cross-section through which hot combustion gas flows to exit flue 1E, as shown by arrows g, h and i. Smoke and combustion gas j from the external portion of the charcoal bed are collected by fume hood 1B and flow via an internal flue to exit flue 1E as indicated by arrow k.

Walls 23 and 24 are constructed of clay or ceramic tiles and, with the intermediate flue, provide substantial insulation of the oven enclosure.

The inner surface of inner wall 23 has a centre of curvature on or closely adjacent the upper run of conveyor 3.

Inner wall 23 concentrates radiative heat on the chicken carcasses on the upper ran of chicken conveyor 3, the radiative heat spectrum within combustion zone Z approaching a black body spectrum.

Charcoal (not shown in FIG. 3) is loaded onto the left hand external end of the upper run of conveyor 3 and advances over a gas burner 21 which lights the charcoal before it enters the oven enclosure.

Blower 19 injects a stream of hot air under lip L of outer wall 24 into the oven enclosure as indicated by arrow c. This enhances combustion of the burning charcoal and sets up a circulation of combustion gas within the combustion chamber, as indicated by arrows d and e. The concave curvature of the inner surface of inner wall 23 facilitates this circulation.

Combustion gas exits the combustion chamber as indicated by arrows f and g.

Ash from spent charcoal falls off the end of the rear roller 5B and is deposited into a removable ash drawer 20. The ash bed in drawer 20 provides heat insulation at the base of the oven enclosure and is periodically disposed of. A riddling arrangement (not shown) may optionally be provided to remove ash from the lower run of the charcoal conveyor 2.

In a variant, other solid fuels, eg wood chips, may be used in place of some or all of the charcoal.

The invention claimed is:

1. An oven comprising an oven enclosure, a solid fuel conveyor for conveying a burning bed of solid fuel through the oven enclosure, and a food conveyor crossing the solid fuel conveyor transversely within the oven enclosure, said oven enclosure comprising;
   a semi-cylindrical vault over the point at which the food conveyor and the solid fuel conveyors cross, said vault being lined with a clay or ceramic surface which concentrates radiative heat on the food in the crossing region;
   a blower arranged in use to inject air into the oven enclosure in such a direction as to circulate hot combustion gas over the food in the crossing region of the conveyors and an exit for said hot combustion gasses in the form of a passage located behind the clay or ceramic surface of the vault and formed by an inner wall forming said vault and an outer wall spaced apart from the inner wall configured so that hot combustion gasses exiting from the oven pass through the passage and heat the day or ceramic surface of the vault.

2. An oven according to claim 1, said vault is arranged in use to circulate hot combustion gas over the food in the crossing region.

3. An oven according to claim 1, wherein in use, hot combustion gas circulates within said oven enclosure and said exiting combustion gas flows through said exit passage in the direction opposite to the direction of circulation of hot combustion gas.

4. An oven according to claim 1, wherein said solid fuel conveyor extends from outside the oven enclosure to inside the oven enclosure and the oven further comprises a lighter which is arranged to light the solid fuel bed before it enters the oven enclosure.

5. An oven according to claim 1, further comprising a temperature sensor arranged to monitor the temperature within the oven enclosure and to output a temperature signal and a speed controller coupled to the solid fuel conveyor and responsive to the temperature signal.

6. An oven according to claim 1, wherein the food conveyor comprises an array of chicken holders arranged to hold spatchcock chickens.

7. An oven according to claim 6, further comprising means for rotating said chicken holders during their linear travel.

8. An oven according to claim 1, wherein the food conveyor has a lower run crossing beneath a lower run of the solid fuel conveyor and an upper run crossing above an upper run of the solid fuel conveyor.

9. An oven according to claim 1, wherein the solid fuel conveyor is conveys a moving bed of solid fuel which is controllable by adjustment of the speed of the conveyor to heat the interior of the oven enclosure to a temperature of above 200° C.

10. An oven according to claim 9, wherein the solid fuel conveyor is driven by a motor and controllable to heat the interior of the oven enclosure to a temperature of above 250° C. by adjusting the speed of the motor driving the fuel conveyor said adjustment being in accordance with a signal from a thermocouple located in the oven enclosure.

11. An oven according to claim 10, wherein the speed of the motor driving the solid fuel conveyor is adjusted to provide a moving bed of solid fuel which heats the interior of the oven enclosure to a temperature in the range 250° C to 450° C.

12. An oven according to claim 9, wherein the solid fuel conveyor is loaded with charcoal.

13. An oven according to claim 9 wherein the food conveyor is arranged to move at such a rate that the cooking time of a chicken within the oven enclosure is below 15 minutes.

14. An oven according to claim 13, wherein the food conveyor is controllable to move at such a rate that the cooking time of a chicken within the oven enclosure is below 10 minutes.

15. An oven according to claim 14, wherein the food conveyor is to controllable move at such a rate that the cooking time within the oven enclosure is in the range 4 minutes to 8 minutes.

16. A method of roasting food comprising loading food onto an inlet end of the food conveyor of an oven as claimed in claim 1, roasting the food over a moving bed of burning solid fuel in the oven enclosure thereof and unloading cooked food from an outlet end of the food conveyor.

17. A method according to claim 16, wherein the solid fuel is charcoal or wood.

18. A method according to claim 16, wherein the food is meat or fish.

* * * * *